United States Patent [19]
Nelson

[11] Patent Number: 5,964,263
[45] Date of Patent: Oct. 12, 1999

[54] METHOD AND MEANS FOR MAKING AN ARTISTIC SCULPTURE

[76] Inventor: Barry Nelson, 8113 Alpine Dr., Urbandale, Iowa 50322

[21] Appl. No.: 09/059,967

[22] Filed: Apr. 14, 1998

[51] Int. Cl.[6] .............................. B27M 1/00; B27M 3/22
[52] U.S. Cl. ......................... 144/329; 144/331; 144/350
[58] Field of Search ............................. 144/329, 330, 144/331, 359, 344, 345, 346, 355

[56] References Cited

U.S. PATENT DOCUMENTS

| | | | |
|---|---|---|---|
| 26,898 | 1/1860 | DeForest | 144/346 |
| 1,214,126 | 1/1917 | Boldt | 144/331 |
| 3,093,171 | 6/1963 | Bean et al. | 144/331 |
| 4,050,489 | 9/1977 | Werner | 144/350 |

*Primary Examiner*—W. Donald Bray
*Attorney, Agent, or Firm*—Zarley, McKee, Thomte, Voorhees & Sease

[57] ABSTRACT

A method and means for forming an artistic sculpture is described. The method includes a unique source of wood: a bowling pin. The inner wood core of the bowling pin is removed to reveal a richly patterned maple which is conducive to forming a wide variety of shapes and styles of artistic works.

10 Claims, 2 Drawing Sheets

METHOD AND MEANS FOR MAKING AN ARTISTIC SCULPTURE

BACKGROUND OF THE INVENTION

Bowling is one of the oldest and most widely played of the world's games. Its history has been traced back to the Stone Age, Egyptians, and Romans. Today, one out of three Americans, or over 72 million people, bowl for recreation or competition.

Since approximately the 1940's, bowling pins have typically comprised a block of hard maple wood. Maple is selected for use in bowling pins both for its durability and for the characteristic sound it makes when struck with a bowling ball. A water based undercoating is typically placed on the wood prior to applying a white coat of paint, followed by a clear coat of lacquer. Red epoxy stripes are then placed horizontally along the base or belly of the pin.

Due to their frequent and extensive use, the necks and bellies of bowling pins eventually become cracked. Once damaged, bowling pins can sometimes be refurbished. However, the pins usually just get discarded in dumpsites or landfills. In a typical bowling alley, bowling pins will get replaced about once per year. If a bowling alley had, for instance, thirty lanes, this would amount to the disposal of approximately six hundred bowling pins in just one year. Based on this large number of discarded pins from just one bowling alley, it is easy to appreciate the value of finding a way to recycle these pins instead of allowing them to accumulate in dumps and landfills, especially in light of the environmental concern of the ever decreasing amount of space in landfills.

The present inventor has now discovered a novel means for recycling bowling pins that would otherwise be discarded as garbage by bowling alleys. It has been surprisingly found that the inner wood core of bowling pins comprises intricately patterned wood. This wood is conducive to being formed into a wide variety of artistic projects.

It is therefore a principal object of this invention to provide a novel means of recycling bowling pins to decrease the amount of waste in landfills.

It is a further object of the present invention to provide a method and means for making artistic projects using the inner wood core of a bowling pin.

It is still a further object of the present invention to provide a method and means for making artistic projects using the inner wood core of a bowling pin which is easy and inexpensive.

The method and means of accomplishing each of the above objectives as well as others will become apparent from the detailed description of the invention which follows hereafter.

SUMMARY OF THE INVENTION

The invention describes a method and means for making artistic sculptures using bowling pins. The method involves removing the inner wooden core of the pin to reveal the uniquely patterned maple. The maple core can then be shaped to form a wide variety of configurations. The sculpture can further be decorated using conventional means, such as carving or laser engraving.

The wooden core can be extracted easily and inexpensively using conventional wood-working tools and methods. The invention serves the dual purpose of providing a novel source of beautiful wood for making artistic projects while also providing a means for recycling bowling pins which would otherwise be taking up space in a dumpsite or landfill.

DETAILED DESCRIPTION OF THE PREFERRED EMBODIMENT

The method of this invention first involves the removal of the inner wood core of a bowling pin. This can be accomplished using a variety of conventional wood-working methods, such as sawing, sanding, etc. The preferred method includes the use of a lathe to trim off the exterior coating and then shaping the pin into the desired configuration. The pin can be further carved or shaped using standard artistic tools. For a smooth finish, the wood is sanded using a power sander or sandpaper.

The maple core of the bowling pin includes various circular or oval patterns which appear to be unique to each bowling pin. These patterns can be further enhanced using stain or varnish. The wood can also be painted, however this conceals the inherent beauty of the patterns in the maple. The wood also lends itself to engraving, such as with a laser machine, and carving. Once the sculpture is in its final artistic form, it is preferably coated with a clear finish to seal and protect the wood. The finish also gives the wood a glossy appearance.

The present invention was conceived by present inventor, who works in the bowling industry, while he was searching for a way to recycle the thousands of bowling pins that were being constantly thrown away. He surprisingly discovered that beneath the familiar white paint and epoxy red stripes of bowling pins lies quality maple having unique and intricate patterns. The wood is solid and can be easily carved, sanded, and sculpted into any desired shape.

The present invention serves two important functions. First, it provides a novel source of wood for artistic projects. Further, since the worn out bowling pins are treated as trash, they can be obtained from bowling alleys or landfills for little or no expense. In comparison, this same type and quantity of wood when purchased from a lumberyard or other wood distributor would be quite expensive. The only expenses involved are the costs associated with using the wood-working equipment and wood treatments applied to the wood.

Second, the invention provides a means for recycling bowling pins which are constantly being disposed of as garbage by the bowling industry. This decreases the number of bowling pins accumulating in dumpsites and landfills. The present invention is therefore friendly to the environment.

The following example is offered to further explain the invention and demonstrate one possible type of artistic sculpture which can be obtained from a bowling pin. It is not intended to limit the invention in any manner.

EXAMPLE

Formation of a Football Sculpture

Figures 1, 2:
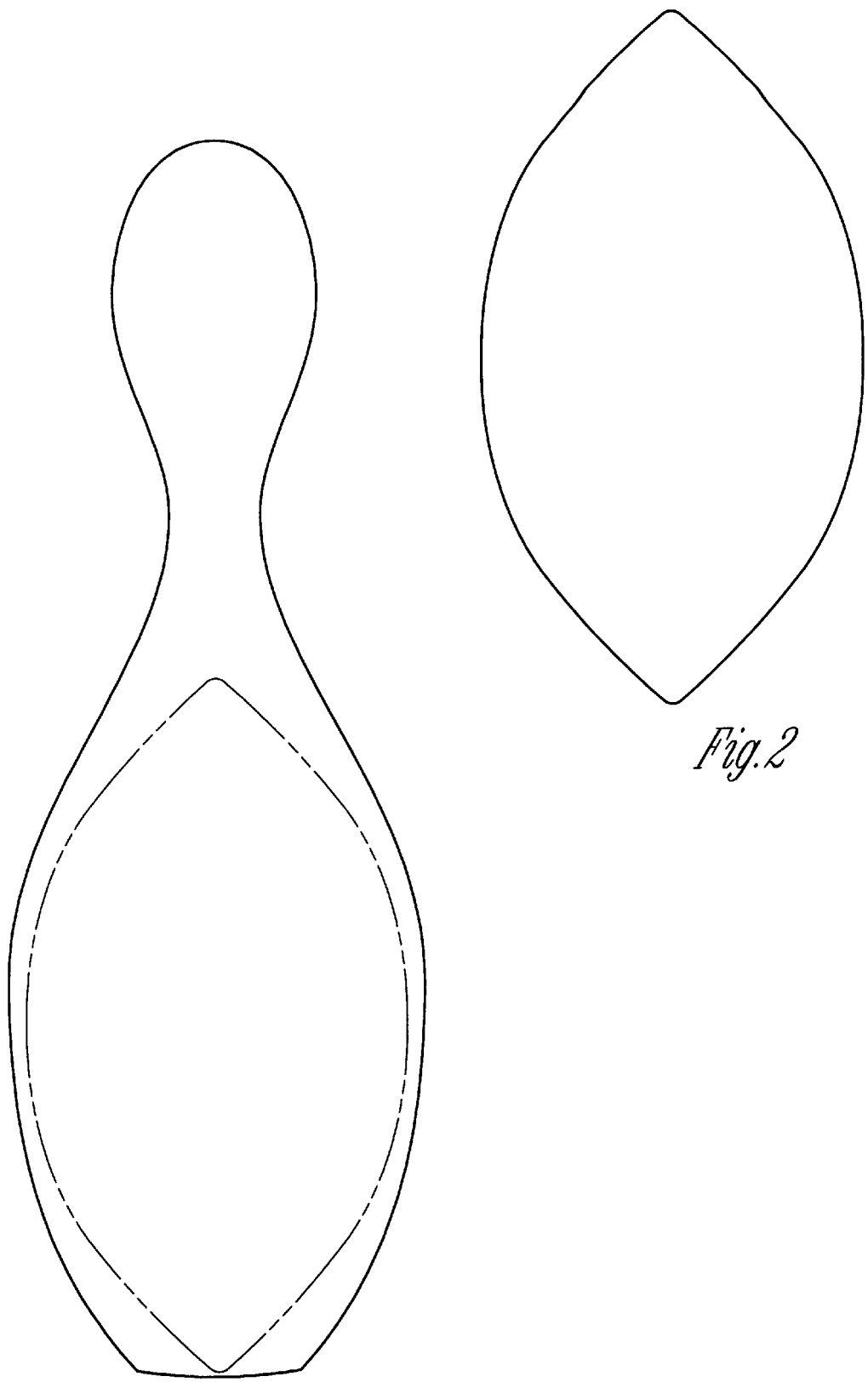
FIG. 1 is a diagram of a bowling pin showing the outline of a football art sculpture in broken lines.
FIG. 2 is a diagram of the football art sculpture as shown extruded from the bowling pin of FIG. 1.

A football sculpture is made by placing a bowling pin in a lathe to trim off the exterior coating and to shape the pin into an oblique football configuration. A preferred lathe is automated and tooled for the particular football shape. A most preferred lathe is manufactured by Mattison. FIG. 1 outlines the football shape as it relates to the bowling pin and shows how a bowling pin is conducive to making sculptures of this and similar shapes. FIG. 2 illustrates the extruded football sculpture.

The football is next sanded on a high speed sander for a better finish. A preferred high speed sander is made by Powermatic. The preferred grit is 120. The invention then uses a custom designed laser machine to engrave team logos onto the football. The laser machine preferred by the inventor is a custom designed rotating device to limit distortion of the laser image.

Figure 3:
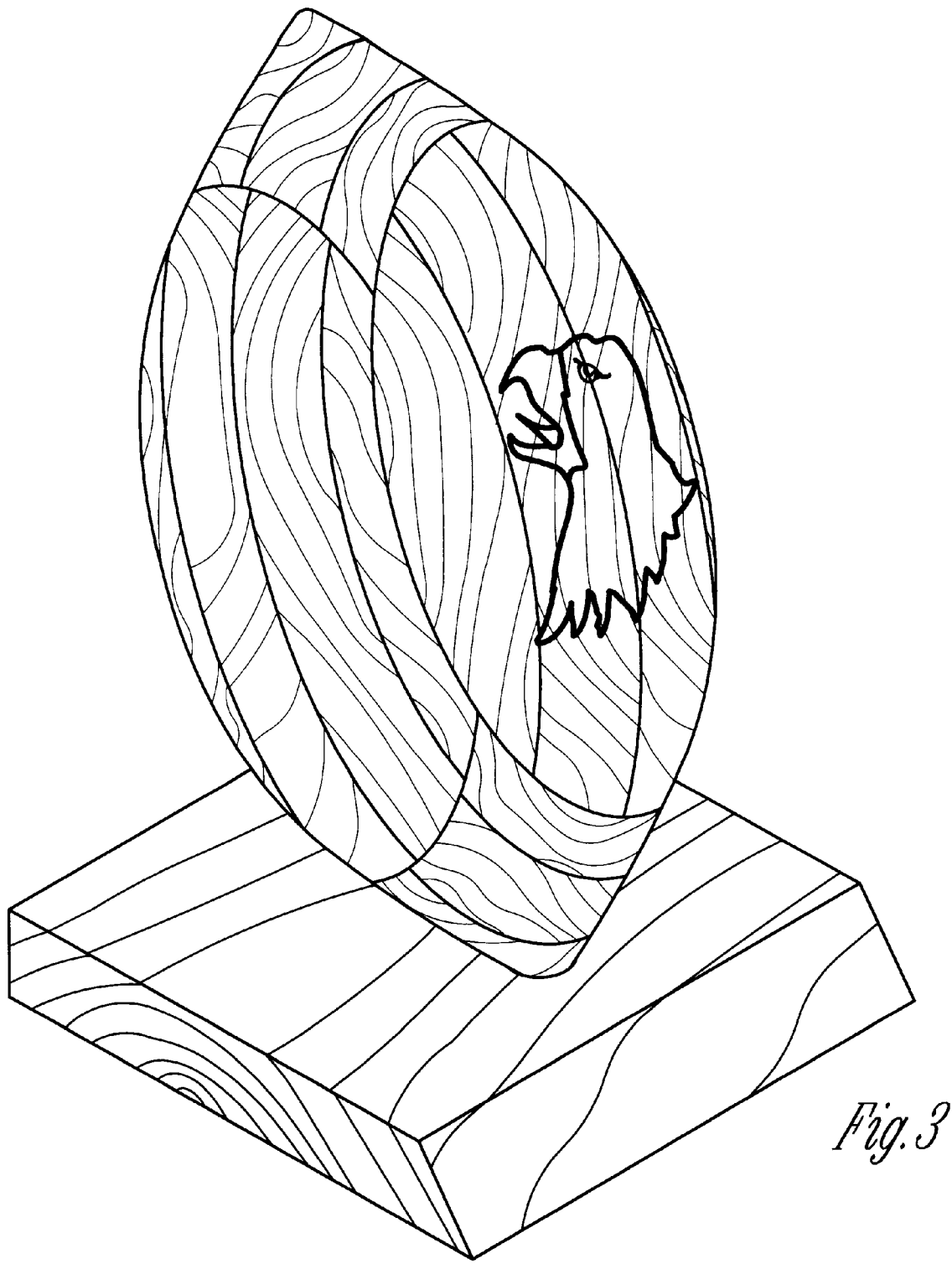
FIG. 3 is a perspective view of a finished and decorated football-shaped sculpture made using the wood core of a bowling pin in accordance with the present invention.

The football is coated with a clear finish, such as polyurethane, to seal and protect the wood and to provide a glossy finish. Finally, the football is mounted on a wood block for display in any manner, such as using a dowel and glue. The block can also be engraved with the appropriate team name and finished in a similar fashion to the football. A finished football sculpture is shown in FIG. 3.

Having described the invention with reference to particular methods and means for manufacturing, and the like, it will be apparent to those of skill in the art that it is not intended that the invention be limited by such illustrative embodiments or mechanisms, and that modifications can be made without departing from the scope or spirit of the invention, as defined by the appended claims. It is intended that all such obvious modifications and variations be included within the scope of the present invention as defined in the appended claims. The claims are meant to cover the claimed components and steps in any sequence which is effective to meet the objectives there intended, unless the context specifically indicates to the contrary.

I claim:

1. A method of making a wood sculpture from a bowling pin comprising:

removing the inner wood core of a bowling pin; and forming the wood core into a desired artistic shape.

2. A method according to claim 1 wherein the inner wood core is removed by sawing or sanding.

3. A method according to claim 1 wherein the inner wood core is removed and shaped using a lathe.

4. A method according to claim 1 wherein the wood is shaped using carving and sculpting tools.

5. A method according to claim 1 further including the step of:

coating the wood with a product selected from the group consisting of stain, varnish, sealer, and combinations thereof.

6. A method according to claim 1 further including the step of:

engraving the wood.

7. A method according to claim 6 wherein the wood is engraved with a laser.

8. A method according to claim 6 wherein the wood is formed into a football shape.

9. A method according to claim 8 wherein the wood football is engraved with football team logo.

10. A method according to claim 1 further including the step of:

creating a design surface on the wood.

* * * * *